(12) United States Patent
Gollier et al.

(10) Patent No.: US 10,691,198 B1
(45) Date of Patent: Jun. 23, 2020

(54) ATTENUATION OF NARCISSUS EFFECT IN PANCAKE LENS ASSEMBLY

(71) Applicant: Facebook Technologies, LLC, Menlo Park, CA (US)

(72) Inventors: Jacques Gollier, Redmond, WA (US); Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 419 days.

(21) Appl. No.: 15/712,003

(22) Filed: Sep. 21, 2017

(51) Int. Cl.
| G06F 3/01 | (2006.01) |
| G02B 5/30 | (2006.01) |
| G02B 1/04 | (2006.01) |
| G02B 13/00 | (2006.01) |

(52) U.S. Cl.
CPC .............. G06F 3/011 (2013.01); G02B 1/041 (2013.01); G02B 5/30 (2013.01); G02B 13/003 (2013.01)

(58) Field of Classification Search
CPC ........... G06F 3/011; G02B 1/041; G02B 5/30; G02B 13/003
See application file for complete search history.

(56) References Cited

U.S. PATENT DOCUMENTS

| 5,757,544 A | 5/1998 | Tabata et al. |
| 5,801,885 A | 9/1998 | Togino |
| 5,853,240 A | 12/1998 | Tanaka et al. |
| 5,949,583 A | 9/1999 | Rallison et al. |
| 6,215,593 B1 | 4/2001 | Bruce |
| 7,136,228 B2 | 11/2006 | Tanijirii et al. |
| 9,829,616 B2 | 11/2017 | Yun et al. |
| 2001/0043163 A1 | 11/2001 | Waldern et al. |

(Continued)

FOREIGN PATENT DOCUMENTS

| EP | 1096293 A2 | 5/2001 |
| EP | 1267197 A2 | 12/2002 |

(Continued)

OTHER PUBLICATIONS

European Patent Office, European Search Report and Opinion, European Patent Application No. 17760743.9, dated Jun. 24, 2019, 19 pages.

(Continued)

*Primary Examiner* — Wen Huang
(74) *Attorney, Agent, or Firm* — Fenwick & West LLP (57) ABSTRACT

A pancake lens assembly includes a back optical element, a front optical element and an absorptive linear polarizer. The back optical element transmits a defined amount of light incident on a surface of the back optical element and reflects a remaining amount of the light incident on the surface of the back optical element. The front optical element is in optical series with the back optical element and positioned closer to an eye-box than the back optical element. The front optical element is configured to transmit toward the eye-box light received from the back optical element having a polarization parallel to a transmission axis of the front optical element. The absorptive linear polarizer is positioned between the front optical element and the eye-box. A transmission axis of the absorptive linear polarizer is oriented parallel to the polarization of the light being transmitted by the front optical element.

20 Claims, 6 Drawing Sheets

(56) References Cited

U.S. PATENT DOCUMENTS

| | | |
|---|---|---|
| 2005/0286135 A1 | 12/2005 | Weissman et al. |
| 2007/0018124 A1 | 1/2007 | Nishi |
| 2007/0070508 A1 | 3/2007 | Ruhle et al. |
| 2012/0057129 A1 | 3/2012 | Durnell et al. |
| 2012/0119978 A1 | 5/2012 | Border et al. |
| 2014/0266990 A1 | 9/2014 | Makino et al. |
| 2015/0370074 A1 | 12/2015 | McDowall et al. |
| 2015/0378074 A1 | 12/2015 | Kollin et al. |
| 2017/0068096 A1 | 3/2017 | Ouderkirk et al. |
| 2017/0161951 A1 | 6/2017 | Fix et al. |
| 2018/0149862 A1* | 5/2018 | Kessler .............. G02B 27/0172 |

FOREIGN PATENT DOCUMENTS

| | | |
|---|---|---|
| EP | 1471375 A1 | 10/2004 |
| WO | WO 95/24713 A1 | 9/1995 |
| WO | WO 01/02893 A1 | 1/2001 |

OTHER PUBLICATIONS

PCT International Search Report and Written Opinion, PCT Application No. PCT/US2017/020261, dated May 15, 2017, 17 pages.

United States Office Action, U.S. Appl. No. 15/441,738, dated Aug. 14, 2019, 11 pages.

European Patent Office, European Partial Search Report, European Patent Application No. 17760743.9, dated Feb. 12, 2019, fifteen pages.

* cited by examiner

ATTENUATION OF NARCISSUS EFFECT IN PANCAKE LENS ASSEMBLY

BACKGROUND

The present disclosure generally relates to a lens assembly for directing image light to a user's eye, and specifically relates to attenuation of the Narcissus effect associated with a pancake lens assembly that focuses the image light to the user's eye.

A pancake lens assembly can be integrated into an optical assembly of a head-mounted display (HMD) in order to focus image light emitted from an electronic display to an eye of a user wearing the HMD. The pancake lens assembly generally relies on polarization of image light to minimize stray light and obtain a preferred image contrast. In the conventional configuration, the pancake lens assembly is capable of reflecting a certain amount of light reflected and/or scattered by a human face (e.g., at least one surface of a user's eye, facial skin, eye lashes, etc.) back to the user's eye. This effect is called the Narcissus effect, as the user's eye is seeing itself in reflection from some of reflecting surfaces of the pancake lens assembly. These reflections are undesirable, and can be bothersome to the user.

SUMMARY

A lens assembly presented herein includes a back optical element, a front optical element in optical series with the back optical element, and an absorptive linear polarizer. The front optical element is in optical series with the back optical element forming a pancake lens assembly. The front optical element is positioned within the pancake lens assembly closer to an eye-box than the back optical element. The back optical element is configured to transmit a defined amount of light incident on a surface of the back optical element, and to reflect a remaining amount of the light incident on the surface of the back optical element. The front optical element is configured to transmit, toward the eye-box, light received from the back optical element having a polarization parallel to a transmission axis of the front optical element. The front optical element is also configured to transmit a first portion of light scattered from at least one surface of the eye having a first polarization parallel to the transmission axis of the front optical element, and to reflect a second portion of the scattered light having a second polarization perpendicular to the transmission axis of the front optical element. The absorptive linear polarizer is positioned between the front optical element and the eye-box. A transmission axis of the absorptive linear polarizer is oriented parallel to the polarization of the light being transmitted by the front optical element. The absorptive linear polarizer is configured to absorb the second portion of the scattered light to mitigate the Narcissus effect. In one embodiment, the absorptive linear polarizer is separate from the front optical element with an air gap between the absorptive linear polarizer and front optical element. In other embodiment, the absorptive linear polarizer is laminated on a surface of the front optical element.

A head-mounted display (HMD) can further integrate the lens assembly, e.g., as part of an optical assembly. The HMD further includes an electronic display for displaying content to a user. The HMD may be part of an artificial reality system. The electronic display is configured to emit image light. The back optical element of the pancake lens assembly is adjacent to the electronic display and transmits at least a portion of the image light to the front optical element. The front optical element is configured to direct, to an eye-box of the HMD corresponding to a location of an eye of the user, at least the portion of the image light received from the back optical element having a polarization parallel to a transmission axis of the front optical element. The absorptive linear polarizer absorbs at least a portion of the image light reflected from at least one surface of the user's eye, thus mitigating the Narcissus effect.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A lens assembly is presented herein that comprises a pancake lens assembly. The pancake lens assembly includes a back optical element (closer to an electronic display) and a front optical element (closer to user's eyes). To prevent reflections of a user's eye from being seen by the user, the lens assembly includes an absorptive linear polarizer placed between the front optical element and an eye-box of the user's eye. The eye-box represents a three-dimensional volume in which the user's eye would be located. A transmission axis of the absorptive linear polarizer is oriented parallel to a polarization of light being transmitted by the front optical element. The absorptive linear polarizer absorbs at least a portion of light reflected from at least one surface of the user's eye to mitigate the Narcissus effect associated with the pancake lens assembly. In some embodiments, a quarter waveplate is added between the absorptive linear polarizer and the eye-box. The quarter-waveplate may mitigate Fresnel reflections of light that are polarized in a direction of the light being transmitted by the front optical element.

In some embodiments, the lens assembly is integrated into a HMD. The HMD may be part of an artificial reality system. The HMD further includes an electronic display configured to emit image light. The back optical element of the pancake lens assembly is adjacent to the electronic display and configured to transmit at least a portion of the image light received from the electronic display to the front optical element. The front optical element is configured to direct, to the eye-box of the HMD corresponding to a location of the user's eye, at least the portion of the image light received from the back optical element having a polarization parallel to a transmission axis of the front optical element. The absorptive linear polarizer absorbs light reflected from at least one surface of the user's eye to mitigate the Narcissus effect associated with the pancake lens assembly.

Figure 1:
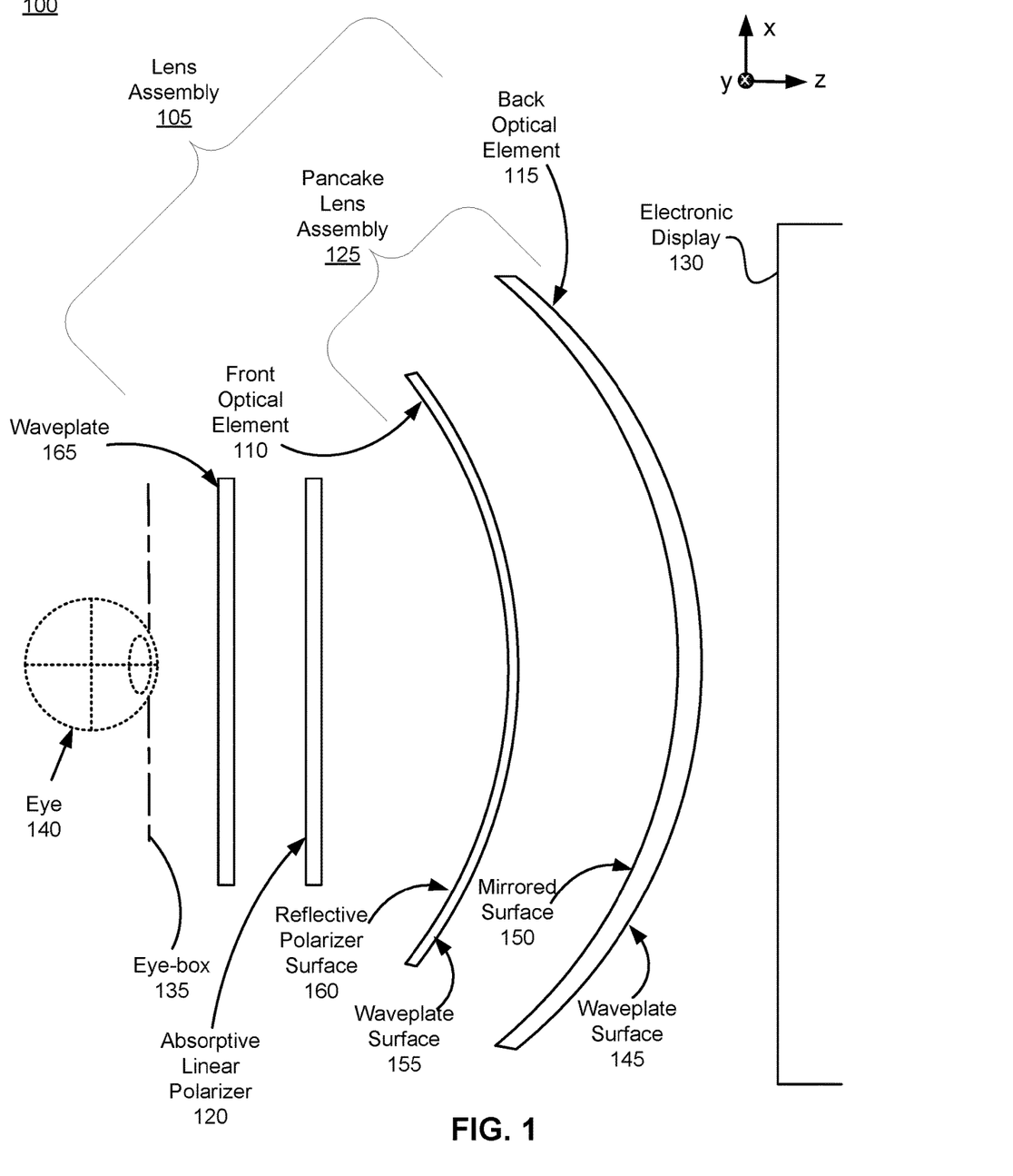
FIG. 1 is an example lens assembly, in accordance with an embodiment.

FIG. 1 is a cross section 100 of an embodiment of a lens assembly 105, in accordance with an embodiment. In some embodiments, the lens assembly 105 is part of a HMD. The lens assembly 105 includes a front optical element 110, a back optical element 115, and an absorptive linear polarizer 120. The front optical element 110 is in optical series with the back optical element 115 forming a pancake lens assembly 125 that focus light from an electronic display 130 to an eye-box 135 where a user's eye 140 is positioned. As shown in FIG. 1, the front optical element 110 is positioned within the pancake lens assembly 125 closer to the eye-box 135 than the back optical element 115. For purposes of illustration, FIG. 1 shows a cross section 100 of the lens assembly 105 associated with a single eye 140, but another lens assembly, separate from the lens assembly 105 shown in FIG. 1, can provide altered image light to another eye of the user. Some embodiments of the lens assembly 105 have different components than those described herein. Similarly, in some cases, functions can be distributed among the components in a different manner than is described herein.

Light emitted from the electronic display 130 may be linearly polarized. In some embodiments, the electronic display 130 includes one or more linear polarizers that linearly polarize light emitted from the electronic display 130. Alternatively, light emitted from light emitting components (e.g., LEDs) of the electronic display 130 is directly emitted as linearly polarized light.

As discussed above, the pancake lens assembly 105 includes the front optical element 110 and the back optical element 115, wherein the back optical element 115 is adjacent to the electronic display 130. One or more surfaces of the front optical element 110 and the back optical element 115 are shaped to correct for field curvature. One or more surfaces of the front optical element 110 may be shaped to be spherically concave (e.g., a portion of a sphere), spherically convex, a rotationally symmetric sphere, a freeform shape, or some other shape that mitigates field curvature. In some embodiments, the shape of one or more surfaces of the front optical element 110 and the back optical element 110 are designed to additionally correct for other forms of optical aberration. In some embodiments, at least one of the front optical element 110 and the back optical element 115 within the pancake lens assembly 125 may have one or more coatings, such as anti-reflective coatings, e.g., to reduce ghost images and enhance contrast.

In one embodiment illustrated in FIG. 1, the back optical element 115 includes a waveplate surface 145 and a mirrored surface 150. For example, the waveplate surface 145 is a quarter-waveplate that shifts polarization of received light. A quarter-waveplate includes a polarization axis and the waveplate surface 145 shifts the polarization axis 45 degrees relative to incident linearly polarized light such that the waveplate surface 145 converts linearly polarized light into circularly polarized light. Likewise, a quarter-waveplate converts circularly polarized light incident to the quarter-waveplate into linearly polarized light. Quarter-waveplates can be made of birefringent materials such as quartz, organic material sheets, or liquid crystal. In one embodiment, the quarter-waveplates are designed to be optimized such that the dependence of the retardance induced by the plate remains close to a quarter of a wave independently of the wavelength and the angle of incidence (e.g., using a so called "zero order waveplate"). In other embodiment (not shown in FIG. 1), instead of being implemented as part of a surface of the back optical element 115, a quarter waveplate is implemented separate from the back optical element 115 and positioned between the electronic display 130 and the back optical element 115. In addition, a linear polarizer (not shown in FIG. 1) may be coupled to the electronic display 130 to generate linearly polarized image light using image light emitted from the electronic display 130. The mirrored surface 150 of the back optical element 115 is partially reflective to reflect a portion of light incident on the mirrored surface 150. In some embodiments, the mirrored surface 150 is configured to transmit approximately 50% of the incident light and reflect approximately 50% of the incident light.

In the embodiment shown in FIG. 1, the front optical element 110 includes a waveplate surface 155 and the reflective polarizer surface 160. The waveplate surface 155 may be implemented as a quarter-waveplate. Alternatively, instead of being implemented as part of a surface of the front optical element 110, a quarter waveplate (not shown in FIG. 1) is implemented separate from the front optical element 110 and positioned between the front optical element 110 and the mirrored surface 150 of the back optical element 115. The reflective polarizer surface 160 is a partially reflective mirror configured to reflect received light of a first linear polarization orthogonal to a transmission axis of the front optical element 110. The reflective polarizer surface 160 is also configured to transmit received light of a second linear polarization parallel to the transmission axis of the front optical element 110. For example, the reflective polarizer surface 160 may be configured to reflect linearly polarized light with a polarization direction in the y direction, and pass light that is linearly polarized in the x direction. In some embodiments, the reflective polarizer surface 160 has a polarization transmission contrast ratio greater than 100 to 1, e.g., 200:1 or 500:1.

Figure 2A:
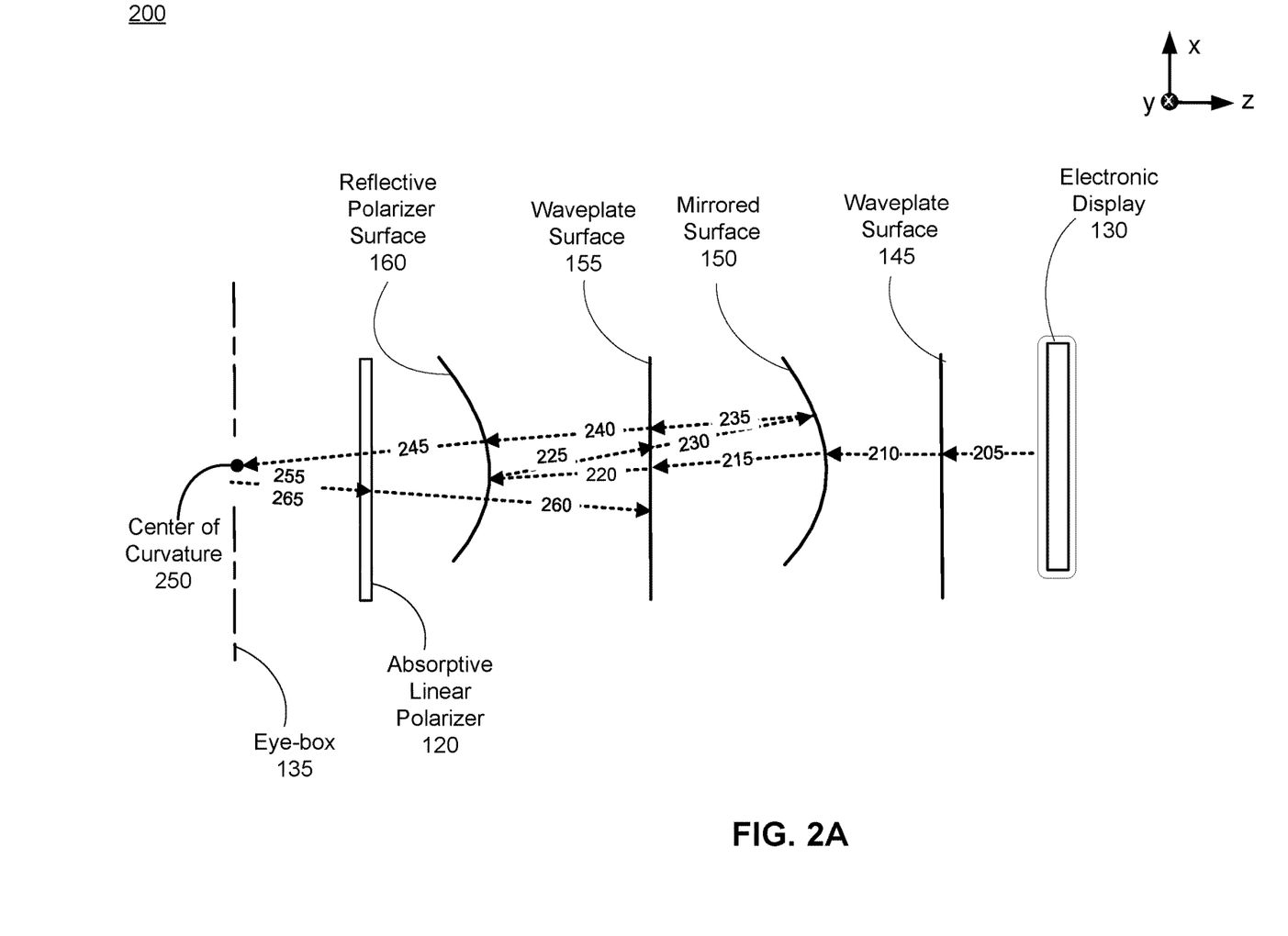
FIG. 2A shows propagation of light in the lens assembly shown in FIG. 1 that includes an absorptive linear polarizer, in accordance with an embodiment.

In some embodiments, the pancake lens assembly 125 mitigates field curvature and accordingly acts to reduce pupil swim. Field curvature is an optical aberration that causes a flat object to appear sharp only in a certain part(s) of the frame, instead of being uniformly sharp across the frame. More generally, field curvature is a result of a focal distance of an optics system not perfectly aligning with all the points on a focal plane. Pupil swim is the effect caused by changes in the location of the user's eye 140 within the eye-box 135 resulting in distortions in the content being presented to the user. Correcting for field curvature mitigates pupil swim. The pancake lens assembly 125 mitigates field curvature in an image that is output to the user's eye 140 to reduce pupil swim. Additionally, the pancake lens assembly 125 has a small form factor, is relatively low weight compared to other optical systems designed to remove field curvature and is configured to have a wide field of view. The operation of the pancake lens assembly 125 within the lens assembly 105 is discussed below with regard to FIG. 2.

The pancake lens assembly 125 may also reflect a certain amount of light reflected and/or scattered by a human face (e.g., at least one surface of the user's eye 140, facial skin, eye lashes, etc.) back to the user's eye 140. This effect is called the Narcissus effect as the user's eye 140 is seeing itself in reflection from, e.g., the mirrored surface 150 of the back optical element 115 and/or the reflective polarizer surface 160 of the front optical element 110.

In order to mitigate the Narcissus effect, the absorptive linear polarizer 120 is included in the lens assembly 105 between the eye-box 135 and reflective polarizer surface 160 of the front optical element 110. A transmission axis of the absorptive linear polarizer 120 is oriented parallel to polarization of light being transmitted by the front optical element 110. In other words, a transmission axis of the absorptive linear polarizer 120 is aligned with a transmission axis of the front optical element 110 (i.e., a transmission axes of the reflective polarizer surface). For example, the transmission axis of the absorptive linear polarizer 120 and the transmission axis of the front optical element 110 are parallel to the x direction. The absorptive linear polarizer 120 transmits a first portion of light scattered from at least one surface of the eye 140 having a first polarization parallel to the transmission axis of the absorptive linear polarizer 120. The absorptive linear polarizer 120 absorbs a second portion of the scattered light having a second polarization perpendicular to the transmission axis of the absorptive linear polarizer 120. In one embodiment, the absorptive linear polarizer 120 is implemented as a separate polarizing element with an air gap between the absorptive linear polarizer 120 and the reflective polarizer surface 160. In an alternate embodiment, the absorptive linear polarizer 120 is laminated on the reflective polarizer surface 160 of the front optical element 110.

Some parts of the human face are reflecting light instead of scattering. Also, correction glasses may be inserted between the eye 140 and the reflective polarizer surface 160, which also contributes to back reflections. Since the light is being reflected instead of being diffused, the polarization state of the reflected light is not affected and the absorptive linear polarizer 120 would not help reducing a magnitude of the Narcissus effect. By adding one more waveplate 165 (e.g., quarter waveplate) between the eye-box 135 and the absorptive linear polarizer 120, pure reflections of light from a user's face and/or correction glasses can also be eliminated. In one embodiment, the waveplate 165 is implemented as a quarter waveplate, e.g., with axis of the quarter waveplate at 45 degrees with the x direction. The waveplate 165 implemented as the quarter waveplate and the absorptive linear polarizer 120 may mitigate Fresnel reflections of light from at least one surface of the eye 140 polarized in a direction of the light being transmitted by the front optical element 110. More details about operations of the absorptive linear polarizer 120 and the waveplate 165 are discussed in conjunction with FIGS. 2A-2B.

FIG. 2A shows propagation of light in the lens assembly 105 shown in FIG. 1 that includes the absorptive linear polarizer 120, in accordance with an embodiment. Light 205 emitted from the electronic display 130 may be linearly polarized. In one embodiment, the electronic display 130 directly emits the light 205 as linearly polarized light. Alternatively, the electronic display 130 is coupled to a linear polarizer (not shown in FIG. 2A) that generates the light 205 as linearly polarized light. The waveplate surface 145 (quarter-waveplate) has an axis 45 degrees (or 90 degrees) relative to the x direction (which may be the direction of polarization of the light 205). The orientation of the waveplate axis relative to the incident linearly polarized light controls the handedness of the emitted circularly polarized light. The waveplate surface 145 changes the polarization of light 205 from linear polarization to circular polarization—shown as light 210. The polarization of light 210 may be clockwise (i.e., right handed circularly polarized) or anti-clockwise (i.e., left handed circularly polarized) based on the orientation of the axis of waveplate surface 145 relative to the incident linearly polarized light 205. A first portion of the light 210 is reflected by the mirrored surface 150, and a second portion of the light 210 is transmitted by the mirrored surface 150 towards the waveplate surface 155 as light 215. In some embodiments, the mirrored surface 150 is configured to reflect approximately 50% of incident light (e.g., the light 210). Similarly as for the waveplate surface 145, the waveplate surface 155 is a quarter-waveplate and changes the polarization of light 215 from circular to linear (referred to as light 220).

The light 220 is incident on the reflective polarizer surface 160, which reflects light that is polarized in a blocking direction (e.g., y direction) and transmits light that is polarized in a perpendicular direction (e.g., x direction). At this point, the light 220 is linearly polarized in the blocking direction. Thus, the reflective polarizer surface 160 reflects the light 220 and the reflected light is referred to as light 225. The waveplate surface 155 changes the linear polarized light 225 to circularly polarized light 230, and the mirrored surface 150 reflects a portion of the polarized light 230, as described above. The reflected portion of light 230 is referred to as light 235.

The light 235 is also circularly polarized; however, its handedness is opposite that of the light 230 and 215 due to the reflection from the mirrored surface 132. Thus, the waveplate surface 155 changes the polarization of the circularly polarized light 235 to linearly polarized light 240. However, as the handedness of the light 235 is opposite to that of the light 215, the polarization of light 240 is perpendicular to that of the light 220. Accordingly, the light 240 is linearly polarized in a direction (e.g., x) perpendicular to the blocking direction (e.g., y) and is therefore transmitted by the reflective polarizer surface 160 as light 245 to the eye-box 135. Note that the absorptive linear polarizer 120 positioned between the eye-box 135 and the reflective polarizer surface 160 transmits the light 245 to the eye-box 135 as a transmission axis of the absorptive linear polarizer 120 is aligned with a transmission axis of the front optical element 110 that includes the reflective polarizer surface 160.

The linearly polarized light 245 may propagate through a center of curvature 250 before reaching at least one surface of the eye 140 and/or a facial area surrounding the eye 140. Although the polarization of light 245 is linear, when the light 245 hits diffusing materials, such as the facial skin, the light 245 may become depolarized. In addition, another source of light can be ambient light (not shown in FIG. 2A)

leaking from edges of the lens assembly 105 and the pancake lens assembly 125. A source of the ambient light may be very bright and typically produces unpolarized light. Thus, in some embodiments, light 255 scattered from the least one surface of the eye 140 and/or the facial area surrounding the eye 140 is unpolarized light.

The unpolarized light 255 can be decomposed into two light components having mutually orthogonal linear polarizations. The scattered unpolarized light 255 can be decomposed into a first light component 260 having Px polarization parallel to the transmission axis of the reflective polarizer surface 160, and into a second light component 265 having Py polarization orthogonal to a transmission axis of the reflective polarizer surface 160 (i.e., parallel to a reflective axis of the reflective polarizer surface 160). The first light component 260 is transmitted through the absorptive linear polarizer 120 and the reflective polarizer surface 160 since the transmission axes of the absorptive linear polarizer 120 and of the reflective polarizer surface 160 are parallel to orientation of Px polarization. A portion of the first light component 260 (not shown in FIG. 2A) will be reflected by the mirrored surface 150 and come back to the reflective polarizer surface 160. However, polarization of the portion of the first light component 260 is now orthogonal to the transmission axis of the reflective polarizer surface 160 (e.g., along y direction) since the waveplate surface 155 is crossed twice, causing the reflective polarizer surface 160 to reflect the light back toward the mirrored surface 150. Note that the mirrored surface 150 attenuates the light at each reflection (e.g., 50%). As the light is reflected several times by the mirrored surface 150 before it has a polarization that aligns with the transmission axis of the reflective polarizer surface 160, it is greatly attenuated before passing back to the eye-box 135. In particular, light having Px polarization has been reflected by the mirrored surface 150 twice. Thus, a magnitude of the first light component 260 reaching the eye-box 135 and the eye 140 has been attenuated four times. Accordingly, a magnitude of this particular component of the Narcissus effect is mitigated by the factor of four.

Without the absorptive linear polarizer 120, the second light component 265 of the scattered light 255 having Py polarization orthogonal to the transmission axis of the reflective polarizer surface 160 would be fully reflected by the reflective polarizer surface 160 back to the eye-box 135 without any attenuation. To prevent the second light component 265 coming back to the eye-box 135 without any attenuation, the absorptive linear polarizer 120 is included between the eye-box 135 and the reflective polarizer surface 160. As discussed above, a transmission axis of the absorptive linear polarizer 120 is aligned with a transmission axis of the reflective polarizer surface 160. By adding the absorptive linear polarizer 120 between the eye-box 135 and the reflective polarizer surface 160, the second light component 265 of the scattered light 255 having Py polarization is absorbed by the absorptive linear polarizer 120 without affecting image brightness.

In an embodiment shown in FIG. 2A, the absorptive linear polarizer 120 is flat with an air gap between the absorptive linear polarizer 120 and the reflective polarizer surface 160. In other embodiment (not shown in FIG. 2A), the absorptive linear polarizer 120 is laminated on the reflective polarizer surface 160 of the front optical element 110. In yet other embodiment, at least one surface of the absorptive linear polarizer 120 is curved. In some embodiments, the absorptive linear polarizer 120 is implemented to have approximately 95% or less (e.g., approximately 90% or 80%) attenuation of photopically weighted visible light.

Without the absorptive linear polarizer 120, a magnitude of the Narcissus effect is Py+Px/4, wherein Px is a magnitude of the first light component 260 of the scattered light 255, and Py is a magnitude of the second light component 265 of the scattered light 255. After including the absorptive linear polarizer 120 between the eye-box 135 and the reflective polarizer surface 160, a magnitude of the Narcissus effect is reduced to Px/4 as the second light component 265 of the scattered light 255 is fully absorbed by the absorptive linear polarizer 120. Considering that the light 255 diffused by a human face is unpolarized and Px=Py, a magnitude of the Narcissus effect is thus attenuated by a factor of five without affecting the image brightness.

Note that the absorptive linear polarizer 120 can also help improving the image contrast. For example, in case the reflective polarizer surface 160 is not a perfect reflecting surface and a portion of image light coming from the electronic display 130 that has its polarization orthogonal to a transmission axis of the reflective polarizer surface 160 would be transmitted through the reflective polarizer surface 160. Without the absorptive linear polarizer 120 located between the eye-box 135 and the reflective polarizer surface 160 this portion of the image light would partly leak towards the eye 140 without being reflected by reflective polarizer surface 160 creating ghost images and reducing contrast. Since the polarization state of this portion of image light is in direction orthogonal to a transmission axis of the absorptive linear polarizer 120, this portion of image light is absorbed by the absorptive linear polarizer 120 before reaching the eye-box 135 and the eye 140.

In some embodiments, the light 255 is reflected from certain parts of a human face instead of being scattered. Also, a user may wear correction glasses inserted between the eye 140 and the reflective polarizer surface 160, which will also contribute to back reflections. Since the light 255 is in this case reflected instead of being diffused, the polarization state of the light 255 is not affected. Thus, the absorptive linear polarizer 120 inserted alone between the eye-box 135 and the reflective polarizer surface 160 cannot mitigate a contribution to the Narcissus effect due to a component of the light 255 having polarization orthogonal to a transmission axis of the absorptive linear polarizer 120.

Figure 2B:
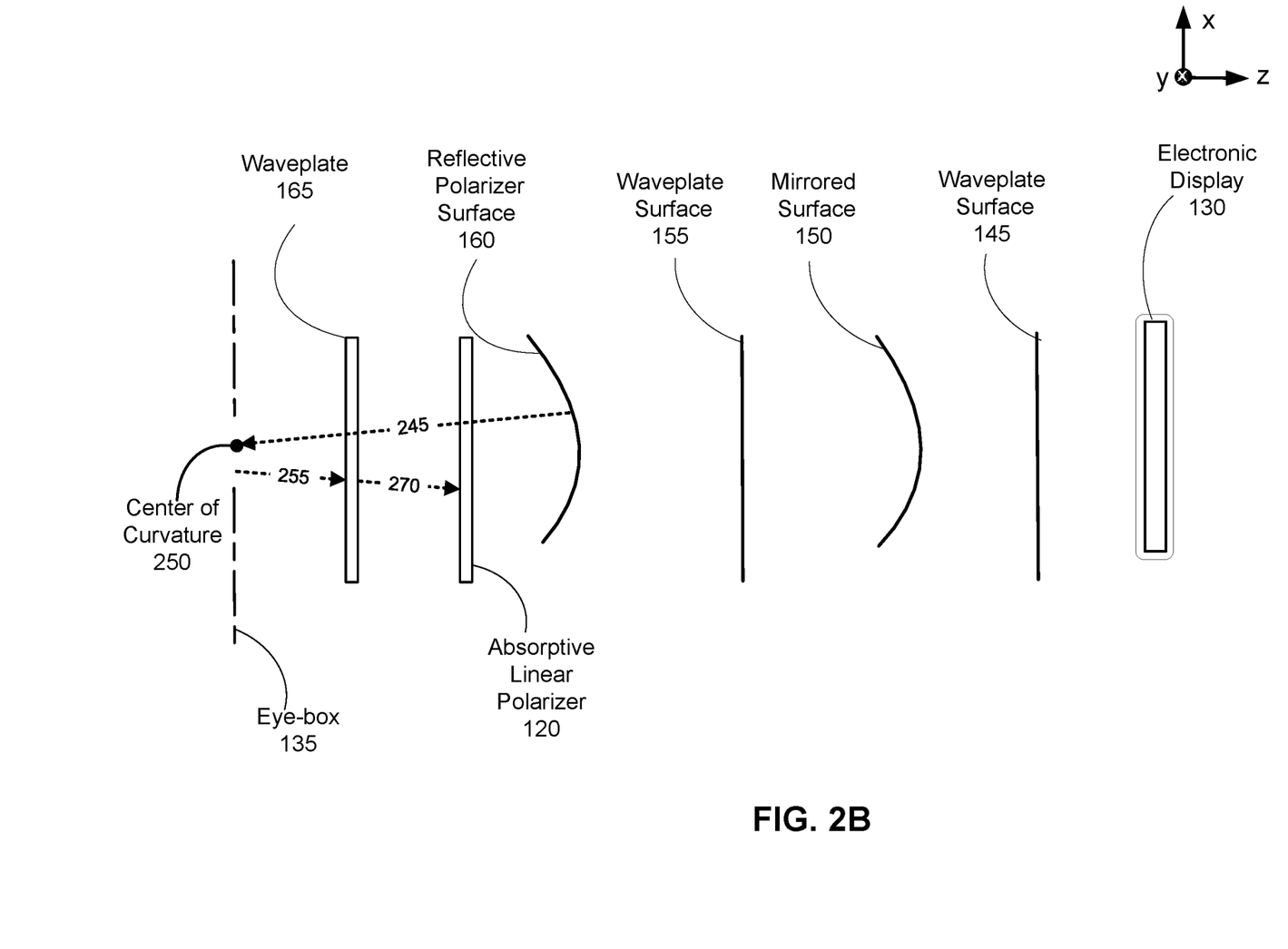
FIG. 2B shows propagation of light in the lens assembly shown in FIG. 1 that includes an absorptive linear polarizer and a waveplate, in accordance with an embodiment.

FIG. 2B shows propagation of light in the lens assembly 105 shown in FIG. 1 that includes the absorptive linear polarizer 120 and the waveplate 165, in accordance with an embodiment. The waveplate 165 is included between the eye-box 135 and the absorptive linear polarizer 120 to mitigate a contribution to the Narcissus effect due to a component of the light 255 having polarization orthogonal to the transmission axis of the absorptive linear polarizer 120. In some embodiments, as discussed, the waveplate 165 can be implemented as a quarter waveplate, e.g., with axis of the quarter waveplate at 45 degrees with x direction. In this case, the reflected light 255 is circularly polarized as the linearly polarized light 245 transmitted by the reflective polarizer surface 160 becomes circularly polarized after propagating through the waveplate 165 implemented as a quarter waveplate. The waveplate 165 generates light 270 from the incident light 255, wherein the light 270 includes reflections (e.g., Fresnel reflections) of the light 255 polarized in a direction orthogonal to a transmission axis of the absorptive linear polarizer 120 (e.g., parallel to y direction). Then, the Fresnel reflections in the light 270 are absorbed by the absorptive linear polarizer 120, thus mitigating the Narcissus effect.

As discussed above in conjunction with FIG. 2A, light propagating through the lens assembly 105 undergoes multiple reflections between the back optical element 115 and the front optical element 110 and passes through multiple materials (i.e., waveplates, reflectors, glass, air, etc.) each having different indices of refraction. In some embodiments, these materials can be chosen to allow the back optical element 115 and the front optical element 110 to compensate each other to remove field curvature.

In some embodiments, the pancake lens assembly 125 can allow for a dynamic range of optical powers (or focal lengths) to be provided in a virtual reality headset by, for example, making relatively small adjustments to the back optical element 115 and/or the front optical element 110. For example, such adjustments can include changing the shape of the back optical element 115 or the front optical element 110, changing the shape of the back optical element 115 and the front optical element 110 in concert, changing the distance between the back optical element 115 and the front optical element 110, or a combination of changing the shape of the optical elements and the distance between them. In one embodiment, the front optical element 110 and the back optical element 115 are thin plastic molded meniscus optical elements that are deformable when a force is applied from an edge, for example, to adjust the focal length of pancake lens assembly 105. Additional details regarding a pancake lens assembly are described with regard to U.S. application Ser. No. 15/179,883, filed on Jun. 10, 2016, U.S. application Ser. No. 15/335,807, filed on Oct. 27, 2016, and U.S. application Ser. No. 15/441,738, filed on Feb. 24, 2017, which are incorporated by reference in their entirety.

Figure 3:
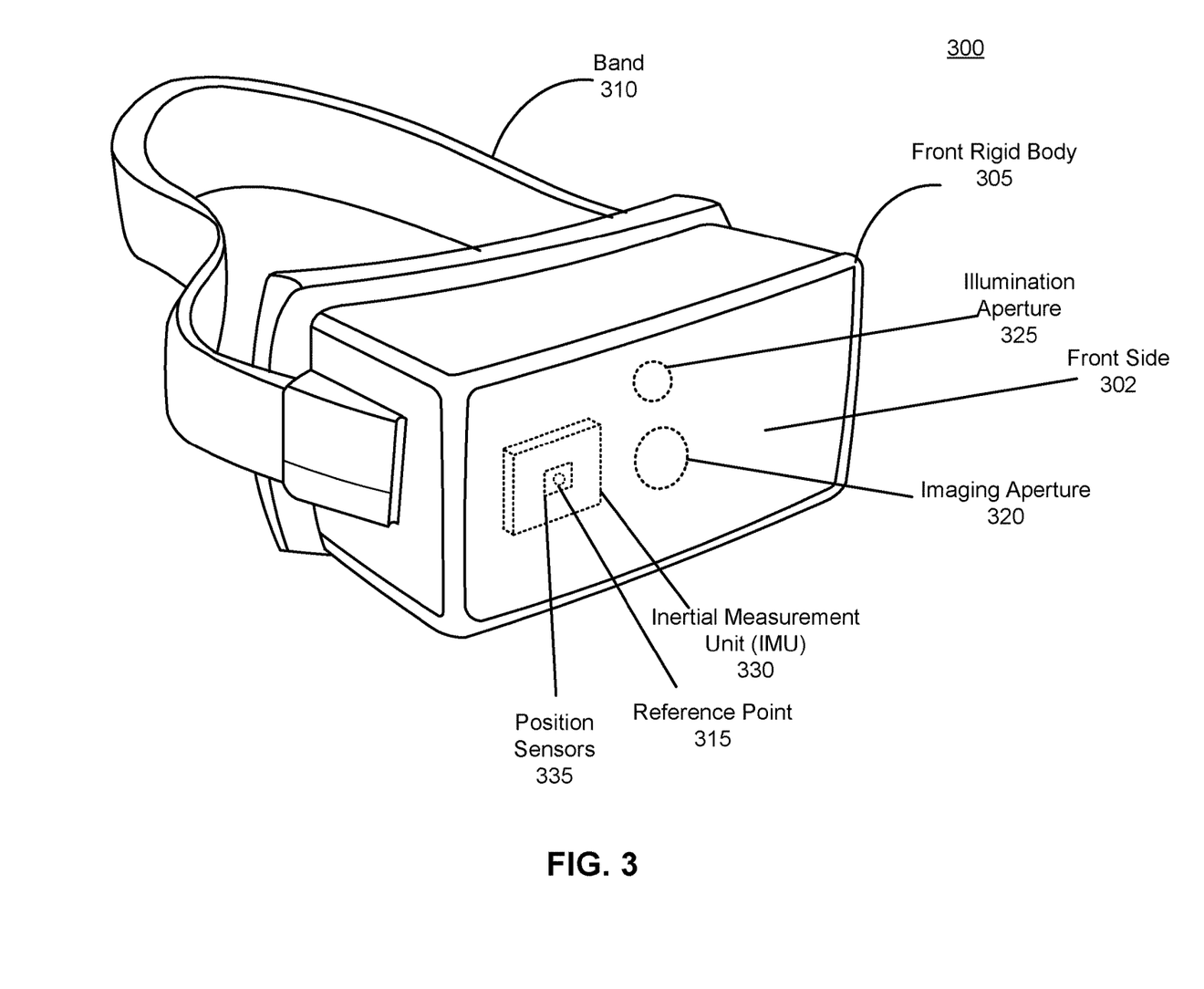
FIG. 3 is a diagram of a head-mounted display (HMD), which may include the lens assembly shown in FIG. 1, in accordance with an embodiment.

FIG. 3 is a diagram of a HMD 300, which may include the lens assembly 105 in FIG. 1, in accordance with an embodiment. The HMD 300 may be part of an artificial reality system. In embodiments that describe AR system and/or a MR system, portions of a front side 302 of the HMD 300 are at least partially transparent in the visible band (~380 nm to 750 nm), and portions of the HMD 300 that are between the front side 302 of the HMD 300 and an eye of the user are at least partially transparent (e.g., a partially transparent electronic display). The HMD 300 includes a front rigid body 305, a band 310, and a reference point 315. In some embodiments, the HMD 300 also includes a DCA configured to determine depth information of a local area surrounding some or all of the HMD 300. The HMD 300 may also include an imaging aperture 320 and an illumination aperture 325, and an illumination source of the DCA emits light (e.g., a structured light pattern) through the illumination aperture 325. An imaging device of the DCA captures light from the illumination source that is reflected from the local area through the imaging aperture 320.

The front rigid body 305 includes one or more electronic display elements (not shown in FIG. 3), one or more integrated eye tracking systems (not shown in FIG. 3), an Inertial Measurement Unit (IMU) 330, one or more position sensors 335, and the reference point 315. In the embodiment shown by FIG. 3, the position sensors 335 are located within the IMU 330, and neither the IMU 330 nor the position sensors 335 are visible to a user of the HMD 300. The IMU 330 is an electronic device that generates fast calibration data based on measurement signals received from one or more of the position sensors 335. A position sensor 335 generates one or more measurement signals in response to motion of the HMD 300. Examples of position sensors 335 include: one or more accelerometers, one or more gyroscopes, one or more magnetometers, another suitable type of sensor that detects motion, a type of sensor used for error correction of the IMU 330, or some combination thereof. The position sensors 335 may be located external to the IMU 330, internal to the IMU 330, or some combination thereof.

Figure 4:
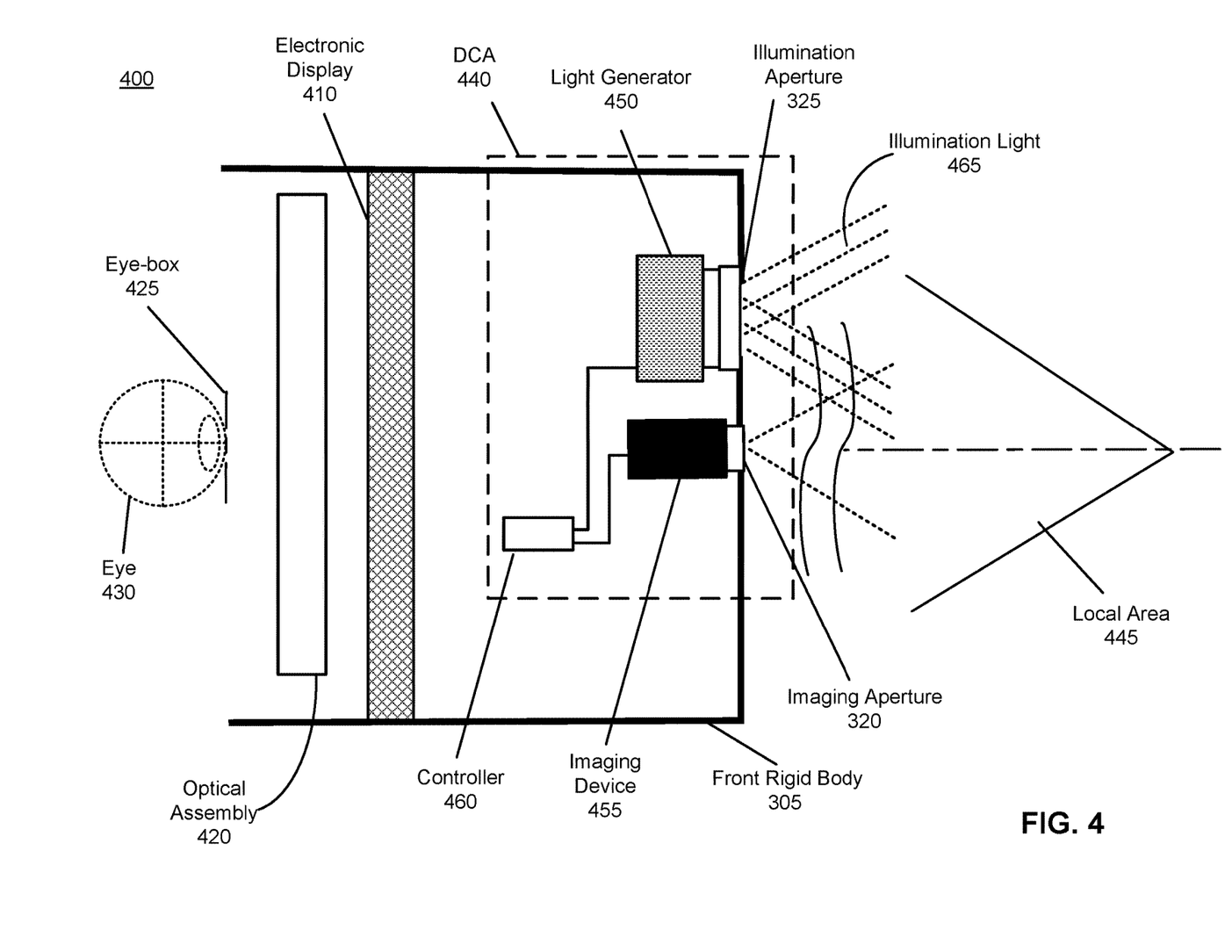
FIG. 4 is a cross section of a front rigid body of the HMD in FIG. 3, in accordance with an embodiment.

FIG. 4 is a cross section 400 of the front rigid body 305 of the HMD 300 shown in FIG. 3. As shown in FIG. 4, the front rigid body 305 includes an electronic display 410 and an optical assembly 420 that together provide image light to an eye-box 425. The eye-box 425 is a region in space that would be occupied by a user's eye 430. For purposes of illustration, FIG. 4 shows a cross section 400 associated with a single eye 430, but another optical assembly 420, separate from the optical assembly 420, provides altered image light to another eye of the user.

The electronic display 410 generates image light. The electronic display 410 may be an embodiment of the electronic display 130 in FIG. 1. In some embodiments, the electronic display 410 includes an optical element that adjusts the focus of the generated image light. The electronic display 410 displays images to the user in accordance with data received from a console (not shown in FIG. 4). In various embodiments, the electronic display 410 may comprise a single electronic display or multiple electronic displays (e.g., a display for each eye of a user). Examples of the electronic display 410 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 410 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display. In some embodiments, one or more of the display block optical elements may have one or more coatings, such as anti-reflective coatings.

The optical assembly 420 magnifies received light from the electronic display 410, corrects optical aberrations associated with the image light, and the corrected image light is presented to a user of the HMD 300. At least one optical element of the optical assembly 420 may be an aperture, a Fresnel lens, a refractive lens, a reflective surface, a diffractive element, a waveguide, a filter, or any other suitable optical element that affects the image light emitted from the electronic display 410. Moreover, the optical assembly 420 may include combinations of different optical elements. In some embodiments, one or more of the optical elements in the optical assembly 420 may have one or more coatings, such as anti-reflective coatings, dichroic coatings, etc. Magnification of the image light by the optical assembly 420 allows elements of the electronic display 410 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the user's field-of-view. In some embodiments, the optical assembly 420 is designed so its effective focal length is larger than the spacing to the electronic display 410, which magnifies the image light projected by the electronic display 410. Additionally, in some embodiments, the amount of magnification may be adjusted by adding or removing optical elements. In some embodiments, the optical assembly 420 includes the lens assembly 105 with the pancake lens assembly 125 shown in FIG. 1 for achieving a preferred image contrast.

In some embodiments, as shown in FIG. 4, the front rigid body 305 may further include a DCA 440 for determining depth information of one or more objects in a local area 445 surrounding some or all of the HMD 300. The DCA 440 includes a light generator 450, an imaging device 455, and a controller 460 that may be coupled to both the light generator 450 and the imaging device 455. The light generator 450 emits light through the illumination aperture 325. The light generator 450 is configured to illuminate the local area 445 with illumination light 465 in accordance with emission instructions generated by the controller 460. The controller 460 is configured to control operation of one or more components of the light generator 450, based on the emission instructions, e.g., in order to adjust a pattern of the illumination light 465 that illuminates the local area 445. In some embodiments, the illumination light 465 is structured light of a defined pattern (e.g., dot pattern, line pattern, etc.).

The light generator 450 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 450 can emit one or more light beams.

The imaging device 455 includes one or more cameras configured to capture, through the imaging aperture 320, at least a portion of the illumination light 465 reflected from the local area 445. The imaging device 455 captures one or more images of one or more objects in the local area 445 illuminated with the illumination light 465. The controller 460 coupled to the imaging device 455 may be also configured to determine depth information for the one or more objects based on the captured portion of the reflected structured light. In some embodiments, the controller 460 provides the determined depth information to a console (not shown in FIG. 4) and/or an appropriate module of the HMD 300 (e.g., a varifocal module, not shown in FIG. 4). The console and/or the HMD 300 may utilize the depth information to, e.g., generate content for presentation on the electronic display 410.

In some embodiments, the front rigid body 305 further comprises an eye tracking system (not shown in FIG. 4) that determines eye tracking information for the user's eye 430. The determined eye tracking information may comprise information about an orientation of the user's eye 430 in an eye-box, i.e., information about an angle of an eye-gaze. An eye-box represents a three-dimensional volume at an output of a HMD in which the user's eye is located to receive image light. In one embodiment, the user's eye 430 is illuminated with structured light. Then, the eye tracking system can use locations of the reflected structured light in a captured image to determine eye position and eye-gaze. In another embodiment, the eye tracking system determines eye position and eye-gaze based on magnitudes of image light captured over a plurality of time instants.

In some embodiments, the front rigid body 305 further comprises a varifocal module (not shown in FIG. 4). The varifocal module may adjust focus of one or more images displayed on the electronic display 410, based on the eye tracking information. In one embodiment, the varifocal module adjusts focus of the displayed images and mitigates vergence-accommodation conflict by adjusting a focal distance of the optical assembly 420 based on the determined eye tracking information. In another embodiment, the varifocal module adjusts focus of the displayed images by performing foveated rendering of the one or more images based on the determined eye tracking information. In yet another embodiment, the varifocal module utilizes the depth information from the controller 460 to generate content for presentation on the electronic display 410.

System Environment

Figure 5:
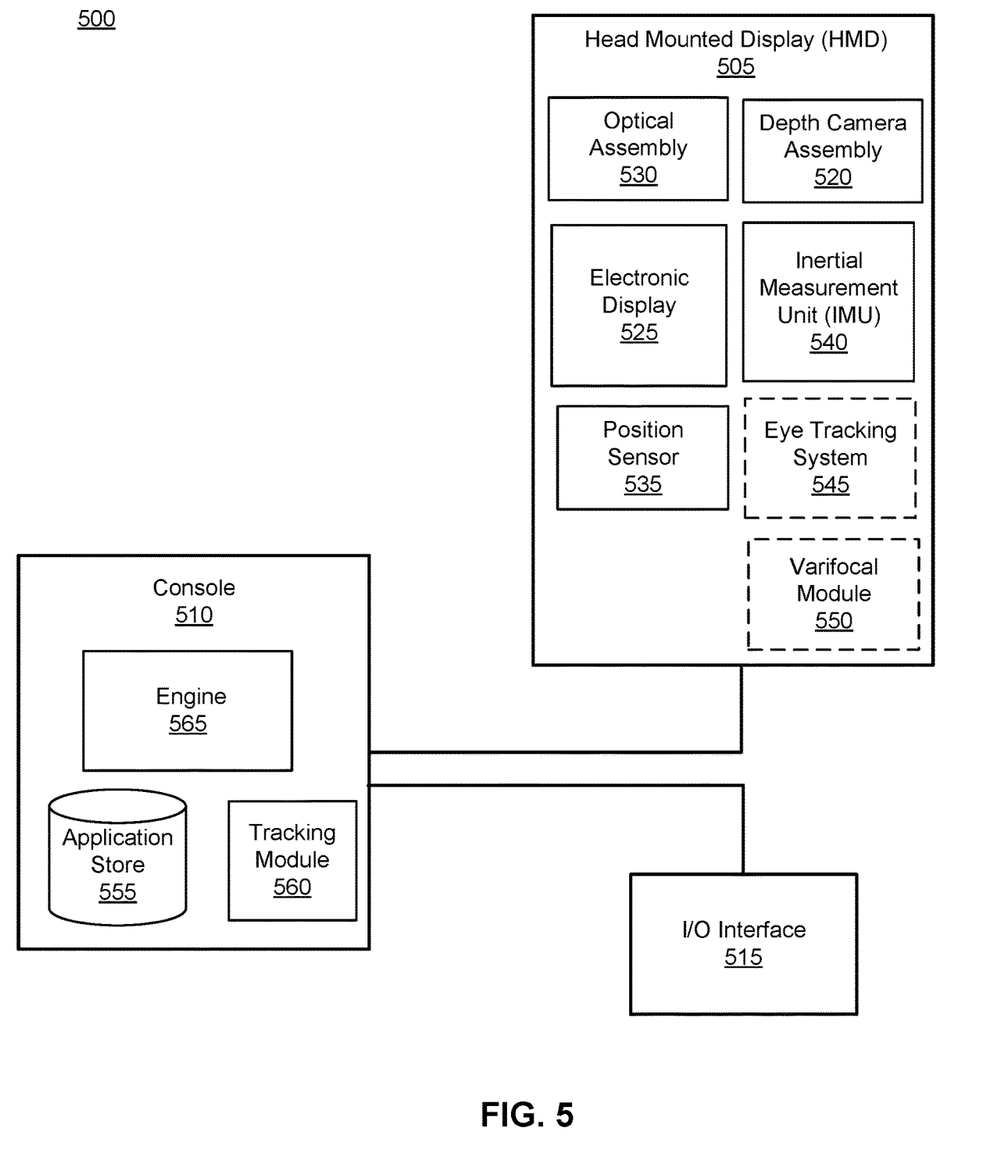
FIG. 5 is a block diagram of a HMD system in which a console operates, in accordance with an embodiment.

FIG. 5 is a block diagram of one embodiment of a HMD system 500 in which a console 510 operates. The HMD system 500 may operate in a VR system environment, an AR system environment, a MR system environment, or some combination thereof. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 is the HMD 100 described above in conjunction with FIG. 1.

The HMD 505 includes a DCA 520, an electronic display 525, an optical assembly 530, one or more position sensors 535, an IMU 540, an optional eye tracking system 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of a local area surrounding some or all of the HMD 505. The DCA 520 can compute the depth information using the data (e.g., based on a captured portion of a structured light pattern), or the DCA 520 can send this information to another device such as the console 510 that can determine the depth information using the data from the DCA 520. The DCA 520 may be an embodiment of the DCA 440 in FIG. 4.

The electronic display 525 displays two-dimensional or three-dimensional images to the user in accordance with data received from the console 510. In various embodiments, the electronic display 525 comprises a single electronic display or multiple electronic displays (e.g., a display for each eye of a user). Examples of the electronic display 525 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof. In some embodiments, the electronic display 525 may represent the electronic display 210 in FIG. 2.

The optical assembly 530 magnifies image light received from the electronic display 525, corrects optical errors associated with the image light, and presents the corrected image light to a user of the HMD 505. The optical assembly 530 includes a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field-of-view of the content presented by the electronic display 525. For example, the field-of-view of the displayed content is such that the displayed content is presented using almost all (e.g., approximately 110 degrees diagonal), and in some cases all, of the user's field-of-view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content. In some embodiments, the optical assembly 530 comprises the lens assembly 105 that includes the pancake lens assembly 125 and the absorptive linear polarizer 120 shown in FIG. 1 to mitigate the Narcissus effect without affecting image brightness. In alternate embodiments, for mitigating the Narcissus effect, the optical assembly 530 comprises the lens assembly 105 that includes the pancake lens assembly 125, the absorptive linear polarizer 120 and the waveplate 165 shown in FIG. 1. In some embodiments, the optical assembly 530 may represent the optical assembly 420 in FIG. 4.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the position sensors 535 may represent the position sensors 335 in FIG. 3. In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors. In some embodiments, the IMU 540 may represent the IMU 330 in FIG. 3.

In some embodiments, the eye tracking system 545 is integrated into the HMD 505. The eye tracking system 545 determines eye tracking information associated with an eye of a user wearing the HMD 505. The eye tracking information determined by the eye tracking system 545 may comprise information about an orientation of the user's eye, i.e., information about an angle of an eye-gaze. In some embodiments, the eye tracking system 545 is integrated into the optical assembly 530. An embodiment of the eye-tracking system 545 may comprise an illumination source and an imaging device (camera).

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures calibration data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 550 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from structured light. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracking system 545, the engine 565 determines resolution of the content provided to the HMD 505 for presentation to the user on the electronic display 525. The engine 565 provides the content to the HMD 505 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to prevent vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A lens assembly comprising:
a back optical element configured to:
transmit a defined amount of light incident on a surface of the back optical element, and
reflect a remaining amount of the light incident on the surface of the back optical element;
a front optical element in optical series with the back optical element and positioned closer to an eye-box than the back optical element, the front optical element configured to transmit toward the eye-box without changing an optical power, light received from the back optical element having a polarization parallel to a transmission axis of the front optical element; and
an absorptive linear polarizer directly adjacent to the front optical element and positioned between the front optical element and the eye-box, wherein a transmission axis of the absorptive linear polarizer is oriented parallel to the polarization of the light being transmitted by the front optical element.

2. The lens assembly of claim 1, further comprising:
a waveplate positioned between the front optical element and the back optical element, the waveplate configured to:
in-couple polarized light, and
generate output light having different polarization than the in-coupled polarized light.

3. The lens assembly of claim 2, wherein the waveplate comprises a quarter waveplate configured to generate the output light of circular polarization using the in-coupled light having linear polarization.

4. The lens assembly of claim 2, wherein the waveplate comprises a quarter waveplate configured to generate the output light of linear polarization using the in-coupled light having circular polarization.

5. The lens assembly of claim 1, wherein the back optical element is configured to:
transmit approximately 50% of the light incident on the surface of the back optical element; and
reflect approximately 50% of the light incident on the surface of the back optical element.

6. The lens assembly of claim 1, wherein the front optical element is configured to transmit a first portion of light reflected from at least one surface of an eye in the eye-box having a first polarization parallel to the transmission axis of the front optical element.

7. The lens assembly of claim 6, wherein the absorptive linear polarizer is configured to absorb a second portion of the reflected light having a second polarization perpendicular to the transmission axis of the front optical element.

8. The lens assembly of claim 1, wherein the absorptive linear polarizer is laminated on a surface of the front optical element and configured to absorb a portion of light reflected from at least one surface of an eye in the eye-box having a polarization perpendicular to the transmission axis of the front optical element.

9. The lens assembly of claim 1, further comprising a waveplate positioned between the absorptive linear polarizer and the eye-box configured to change polarization of light incident on a surface of the waveplate.

10. The lens assembly of claim 9, wherein:
the waveplate comprises a quarter waveplate; and
the quarter wave plate polarizer and the absorptive linear polarizer mitigate reflections of light from at least one surface of an eye in the eye-box polarized in a direction of the light being transmitted by the front optical element.

11. The lens assembly of claim 1, wherein the lens assembly is a component of a head-mounted display (HMD).

12. The lens assembly of claim 11, wherein:
the back optical element is adjacent to an electronic display of the HMD;
the electronic display emits image light incident on the surface of the back optical element.

13. The lens assembly of claim 12, further comprising:
a linear polarizer coupled to the electronic display that generates linearly polarized image light using the image light emitted from the electronic display; and
a quarter waveplate positioned between the linear polarizer and the back optical element that generates circularly polarized image light using the linearly polarized image light.

14. A head-mounted display (HMD) comprising:
an electronic display configured to emit image light;
a back optical element adjacent to the electronic display configured to transmit at least a portion of the image light;
a front optical element in optical series with the back optical element and positioned closer to an eye-box of the HMD corresponding to a location of a user's eye, the front optical element configured to transmit toward the eye-box without changing an optical power, at least the portion of the image light received from the back optical element having a polarization parallel to a transmission axis of the front optical element; and
an absorptive linear polarizer directly adjacent to the front optical element and positioned between the front optical element and the eye-box, wherein a transmission axis of the absorptive linear polarizer is oriented parallel to the polarization of at least the portion of the image light being transmitted by the front optical element.

15. The HMD of claim 14, wherein the back optical element is configured to:
transmit approximately 50% of light incident on a surface of the back optical element; and
reflect approximately 50% of the light incident on the surface of the back optical element.

16. The HMD of claim 14, wherein the front optical element is configured to transmit a first portion of light reflected from at least one surface of the user's eye having a first polarization parallel to the transmission axis of the front optical element.

17. The HMD of claim 16, wherein the absorptive linear polarizer is configured to absorb a second portion of the reflected light having a second polarization perpendicular to the transmission axis of the front optical element.

18. The HMD of claim 14, wherein the absorptive linear polarizer is laminated on a surface of the front optical element and configured to absorb a portion of light reflected from at least one surface of the user's eye having a polarization perpendicular to the transmission axis of the front optical element.

19. The HMD of claim 14, further comprising a waveplate positioned between the absorptive linear polarizer and the eye-box configured to change polarization of light incident on a surface of the waveplate.

20. The HMD of claim 19, wherein:
the waveplate comprises a quarter waveplate; and
the quarter waveplate and the absorptive linear polarizer mitigate reflections of light from at least one surface of the user's eye polarized in a direction of at least the portion of the image light being transmitted by the front optical element.

* * * * *

UNITED STATES PATENT AND TRADEMARK OFFICE
CERTIFICATE OF CORRECTION

PATENT NO. : 10,691,198 B1
APPLICATION NO. : 15/712003
DATED : June 23, 2020
INVENTOR(S) : Jacques Gollier and Andrew John Ouderkirk It is certified that error appears in the above-identified patent and that said Letters Patent is hereby corrected as shown below:

In the Claims

Column 18, Line 22, In Claim 1, after "transmit", insert --,--
Column 19, Line 36, In Claim 14, after "transmit", insert --,--

Signed and Sealed this
Tenth Day of November, 2020

Andrei Iancu
*Director of the United States Patent and Trademark Office*